(12) United States Patent
Hauck

(10) Patent No.: US 9,982,769 B2
(45) Date of Patent: May 29, 2018

(54) BELT PULLEY ARRANGMENT

(71) Applicant: Schaeffler Technologies AG & Co. KG, Herzogenaurach (DE)

(72) Inventor: Christian Hauck, Altdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 287 days.

(21) Appl. No.: 14/923,902

(22) Filed: Oct. 27, 2015

(65) Prior Publication Data
US 2016/0138700 A1     May 19, 2016

(30) Foreign Application Priority Data
Nov. 13, 2014 (DE) .................. 10 2014 223 228

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16D 3/00* | (2006.01) |
| *F16H 55/14* | (2006.01) |
| *F16H 55/36* | (2006.01) |
| *F16F 15/123* | (2006.01) |

(52) U.S. Cl.
CPC ....... *F16H 55/36* (2013.01); *F16F 15/12306* (2013.01); *F16H 2055/366* (2013.01)

(58) Field of Classification Search
CPC ........ F16C 41/206; F16C 7/022; F16H 55/36; F16H 2055/366; E05Y 2201/49
USPC ..................................... 474/70, 94
See application file for complete search history.

(56) References Cited

U.S. PATENT DOCUMENTS

| | | | | |
|---|---|---|---|---|
| 2,885,896 A | * | 5/1959 | Hungerford, Jr. | ........ F16H 9/04 192/12 BA |
| 5,598,913 A | * | 2/1997 | Monahan | ............... F16D 41/206 192/41 S |
| 6,083,130 A | * | 7/2000 | Mevissen | ................ F02B 67/06 192/107 T |
| 7,591,357 B2 | * | 9/2009 | Antchak | ............... F16D 41/206 192/41 S |

(Continued)

FOREIGN PATENT DOCUMENTS

| | | |
|---|---|---|
| DE | 69817556 | 6/2004 |
| DE | 102009038221 | 2/2011 |

(Continued)

*Primary Examiner* — Henry Y Liu
(74) *Attorney, Agent, or Firm* — Volpe and Koenig, P.C.

(57) ABSTRACT

A belt pulley arrangement with a belt pulley that is fastenable to rotate on a shaft, a torsion spring arranged within the belt pulley for enabling a transmission of torque between the belt pulley and shaft. The torsion spring acts with one end against the shaft and with an other end against the belt pulley. A looped flat spiral spring is arranged radially between the belt pulley and the torsion spring and acting as a free-running clutch. The torsion spring is arranged on one of its axial ends in a first sleeve that is connected so that it can rotate with a radial inner lateral surface of the belt pulley. The looped flat spiral spring is arranged radially between the first sleeve and the torsion spring, and contacts, in its extended state, at least in some sections on the inner lateral surfaces of the first sleeve and belt pulley.

10 Claims, 4 Drawing Sheets

(56) References Cited

U.S. PATENT DOCUMENTS

| | | | | |
|---|---|---|---|---|
| 7,618,337 B2* | 11/2009 | Jansen | ................... | F02B 67/06 192/41 S |
| 7,708,661 B2* | 5/2010 | Pflug | ................... | F16F 15/123 192/104 B |
| 7,712,592 B2* | 5/2010 | Jansen | ................... | F16D 3/52 192/41 S |
| 7,766,774 B2* | 8/2010 | Antchak | ................ | F16D 7/022 192/41 S |
| 7,975,821 B2* | 7/2011 | Antchak | ................ | F16D 7/022 192/41 S |
| 7,998,008 B2* | 8/2011 | Kamdem | ............. | F16D 41/206 474/161 |
| 8,047,920 B2* | 11/2011 | Jansen | ................... | F16D 3/52 464/60 |
| 8,132,657 B2* | 3/2012 | Antchak | ................ | F16D 7/022 192/41 S |
| 8,302,753 B2* | 11/2012 | Antchak | ................ | F16D 41/206 192/113.32 |
| 8,534,438 B2* | 9/2013 | Antchak | ................ | F16D 41/206 192/113.32 |
| 8,678,157 B2* | 3/2014 | Ward | ................... | F16D 7/022 192/41 R |
| 8,789,670 B2* | 7/2014 | Antchak | ................ | F16D 7/022 192/212 |
| 8,813,932 B2* | 8/2014 | Ward | ................... | F16D 41/206 192/41 S |
| RE45,156 E* | 9/2014 | Jansen | ................... | F16D 3/52 464/60 |
| 8,820,503 B2* | 9/2014 | Schneider | ............. | F16D 41/206 192/41 S |
| 8,888,619 B2* | 11/2014 | Antchak | ................ | F16D 7/022 474/74 |
| 8,931,610 B2* | 1/2015 | Serkh | ................... | F16D 41/206 192/41 S |
| 8,951,153 B2* | 2/2015 | Ishida | ................... | F16D 43/18 474/74 |
| 8,985,293 B2* | 3/2015 | Marion | ................... | F16D 13/76 192/113.32 |
| 9,169,914 B2* | 10/2015 | Serkh | ................... | F16H 55/36 |
| 9,181,989 B2* | 11/2015 | Mevissen | ................ | F02B 67/06 |
| 9,476,497 B2* | 10/2016 | Liu | ................... | F02B 67/06 |
| 9,611,928 B2* | 4/2017 | Li | ................... | F16H 55/36 |
| 9,638,270 B2* | 5/2017 | Antchak | ................ | F16D 7/022 |
| 2004/0092346 A1* | 5/2004 | King | ................... | F16D 41/20 474/70 |
| 2005/0250607 A1* | 11/2005 | Jansen | ................... | F02B 67/06 474/74 |
| 2007/0240964 A1* | 10/2007 | Saito | ................... | F16D 41/206 192/41 S |
| 2008/0139351 A1* | 6/2008 | Pflug | ................... | F16F 15/123 474/94 |
| 2010/0178990 A1* | 7/2010 | Jansen | ................... | F16D 3/52 464/39 |
| 2011/0065537 A1* | 3/2011 | Serkh | ................... | F16D 7/022 474/94 |
| 2012/0298474 A1* | 11/2012 | Ward | ................... | F16D 7/022 192/41 S |
| 2013/0324335 A1* | 12/2013 | Chen | ................... | F16D 41/206 474/94 |
| 2015/0167816 A1* | 6/2015 | Li | ................... | F16H 55/36 474/166 |
| 2015/0252884 A1* | 9/2015 | Serkh | ................... | F16H 55/36 474/94 |
| 2015/0276039 A1* | 10/2015 | Williams | ............. | F16D 41/206 474/94 |
| 2015/0285365 A1* | 10/2015 | Canto Michelotti | ... | F16H 55/36 474/94 |

FOREIGN PATENT DOCUMENTS

| | | |
|---|---|---|
| DE | 102009052611 | 5/2011 |
| WO | 2005057037 | 6/2005 |
| WO | 2014007906 | 1/2014 |

* cited by examiner

BELT PULLEY ARRANGMENT

INCORPORATION BY REFERENCE

The following documents are incorporated herein by reference as if fully set forth: German Patent Application No. 102014223228.7, filed Nov. 13, 2014.

BACKGROUND

The present invention relates to a belt pulley arrangement.

Belt pulley arrangements are used, for example, in belt drives of motor vehicles. An auxiliary unit driven by a belt drive can be, for example, a generator, an electric machine that can be operated as a generator or as an electric motor, an air-conditioning system compressor, or a pump, each of which can be driven by the crankshaft of an internal combustion engine via a drive belt. While internal combustion engines are running, rotational imbalances or rotational oscillations occur in the crankshaft, as well as drivetrain oscillations during shifting processes of vehicle transmissions, for example, during start-stop processes. To prevent these rotational oscillations from being transmitted disadvantageously to the drive shafts of the auxiliary units, it is known to equip belt pulley arrangements with decoupling means that make sure that rotational oscillations are not transmitted at all or only to a damped degree to the driveshaft of the auxiliary units. The decoupling means are usually free-running devices that enable torque to be transmitted from the belt pulley to the driveshaft of the auxiliary unit, but prevent torque transmission in the opposite load direction.

DE 10 2009 052 611 A1 discloses a belt pulley arrangement with a hub that can be fastened to a driveshaft, a belt pulley supported so that it can rotate on the hub, as well as a bracket-less torsion spring. The torsion spring extends axially between the hub and belt pulley and is arranged radially between the hub and belt pulley. By means of the torsion spring, a torque transmission between the belt pulley and hub is made possible. For this purpose, the torsion spring is arranged with its one end against the hub and with its other end against the belt pulley. The belt pulley arrangement also has a free-running device that consists of a looped flat spiral spring arranged radially between the hub and belt pulley as well as coaxial to the torsion spring. The torsion spring has a greater winding diameter than the looped flat spiral spring. The looped flat spiral spring is arranged on the radial inside and faces the hub. The torsion spring is arranged on the radial outside and faces the belt pulley.

WO 2014/007906 A1 describes a belt pulley arrangement with a belt pulley supported on a shaft, a torsion spring, and a looped flat spiral spring that is arranged radially within the torsion spring and wound around the shaft. If a predetermined torque is exceeded, an overload function is activated. For this purpose, the belt pulley has an engagement surface that can be brought into engagement with one end of the looped flat spiral spring, wherein the looped flat spiral spring is angled away from the shaft and the friction engagement of the looped flat spiral spring with the shaft is reduced. If the belt pulley rotates in the opposite direction, the torque of the belt pulley can no longer be transmitted, because the looped flat spiral spring is actuated in the opening direction. In this situation there is the risk that the torsion spring is not driven and can become jammed axially in the interior space.

EP 1 692 409 B1 includes a decoupler arrangement with a hub that is attached rigidly on a shaft and extends axially between a first and a second end. A belt pulley is fastened to the hub so that it can rotate. A carrier that has a first and a second side, as well as a retaining bump projecting from one of the sides, is mounted around the first end of the hub. Between the hub and carrier extends a torsion spring for transmitting torque between the hub and carrier. On the first end of the hub, a thrust plate is attached rigidly that has a slot for holding the retaining bump. The retaining bump can be moved in the slot, in order to limit the rotation of the carrier and the thrust plate relative to each other and simultaneously to prevent a selective rotational movement of the torsion spring relative to the hub and to the carrier. The decoupler arrangement can be equipped with a free-running coupling device arranged between the torsion spring and belt pulley in the form of a looped flat spiral spring.

SUMMARY

The objective of the present invention is to disclose an improved belt pulley arrangement that effectively prevents an overloading of the torsion spring. Another objective is making sure that the torsion spring always rotates with the belt pulley.

A belt pulley arrangement with one or more features of the invention is provided to meet this objective.

The belt pulley arrangement according to the invention first comprises a belt pulley that can be mounted on a shaft so that it can rotate. Inside the belt pulley, a torsion spring is arranged that enables a torque transmission between the belt pulley and shaft. The torsion spring acts with its one end against the shaft and with its other end against the belt pulley. The belt pulley arrangement further comprises a looped flat spiral spring that acts as a free-running coupling device and is arranged between the belt pulley and torsion spring. The torsion spring is arranged on its one axial end in a first sleeve, wherein the first sleeve is connected so that it can rotate with a radially inner lateral surface of the belt pulley. Another essential feature of the invention is that the looped flat spiral spring contacts, at least in some section, on the inner lateral surfaces of the first sleeve and belt pulley in its extended state.

Through the arrangement of the looped flat spiral spring according to the invention, under loading, the looped flat spiral spring enters into the hole of the belt pulley. Due to the widening of the diameter of the looped flat spiral spring, this produces a non-positive connection between the belt pulley and sleeve that transmits the torque of the belt pulley to the sleeve. It is advantageous that a bracket-less looped flat spiral spring can be used. The looped flat spiral spring is designed so that it reliably transmits torque up to a specified maximum value. If the torque increases above the maximum value, the looped flat spiral spring slips and thus protects the torsion spring from a deflection that is too large. Because the wire cross section of the looped flat spiral spring is mainly loaded in tension, it must be designed large enough that slip torque does not result in overloading of the spring material.

According to one preferred embodiment, the torsion spring is arranged on its other axial end in a second sleeve that can be connected locked in rotation to the shaft, advantageously by means of a press-fit connection. Thus, in this construction, both axial ends of the torsion spring are located in a sleeve.

It has proven advantageous if a first spring ramp is arranged in the first sleeve and a second spring ramp is arranged in the second sleeve. The torsion spring is in contact with the first and second spring ramps for transmitting a torque from the belt pulley to the shaft. Via the first spring ramp, the torque is transmitted into the torsion spring and via the second spring ramp to the die second sleeve, which finally transmits the torque to the shaft. For a torque that is too high, the looped flat spiral spring opens, i.e., the spiral spring contracts and no longer contacts the first sleeve. The first sleeve is thus no longer pressed against the belt pulley, wherein a transmission of the excess torque can be reliably prevented.

It has proven advantageous to provide the belt pulley arrangement with a driving mechanism. The driving mechanism comprises a driving disk that can be mounted on the shaft. A slot extending over a partial area of the circumference is formed in the driving disk. A pin of the first spring ramp engages in the slot. The driving mechanism ensures that the torsion spring rotates with the belt pulley. If the belt pulley is loaded in the driving direction, the torsion spring receives the torque and moves the pin in the slot of the driving disk. Consequently, the slot must be dimensioned so that it can cover the operating range, i.e., the necessary oscillation angles. If the belt pulley deflects in the free-running direction, the driving disk moves the pin. By means of the pin, the first sleeve is also carried along, so that there can be no relative movement between the two spring ramps. This guarantees that the torsion spring is also always carried along.

Without the previously described driving mechanism, if the belt pulley rotated in the opposite direction (overtaking direction), no torque would be transmitted anymore because the looped flat spiral spring would be actuated in the opening direction. In the overtaking process there would then be the risk that the torsion spring and first sleeve would not rotate together with the belt pulley. In this case, it would result in a relative movement between the spring ramps. The torsion spring would run axially upward on the spring ramps and compress axially. In the worst case, the torsion spring could move axially against the block and generate a large enough axial load that the press-fit connections would fail, leading to complete failure of the device. The described driving mechanism prevents these disadvantages.

According to one advantageous embodiment, the second sleeve is supported on the radial outside on a sliding bearing that is arranged on the inner lateral surface of the belt pulley.

Alternatively, the second sleeve can also be supported on a needle bearing. The design with a needle bearing is especially favorable because it leads to high oscillation angles in drive systems of modern motor vehicles due to, among other things, frequently lower excitation frequencies (3-cylinder engine, cylinder cutoff). Here, the wear of the sliding bearing can become impermissibly high, wherein also the tilting moment of a rolling bearing used for supporting the belt pulley would become larger and larger. Through the use of a needle bearing instead of a sliding bearing, this result can be counteracted. Because the entire axial guide of the belt pulley is taken over by the rolling bearing, the needle bearing must receive no axial forces at all.

The looped flat spiral spring is advantageously made from spring steel.

The belt pulley arrangement is preferably part of a belt drive of a motor vehicle.

BRIEF DESCRIPTION OF THE DRAWINGS

Preferred embodiments of the invention are explained in more detail below with reference to the accompanying figures. Shown are.

DETAILED DESCRIPTION OF THE PREFERRED EMBODIMENTS

Figure 1:
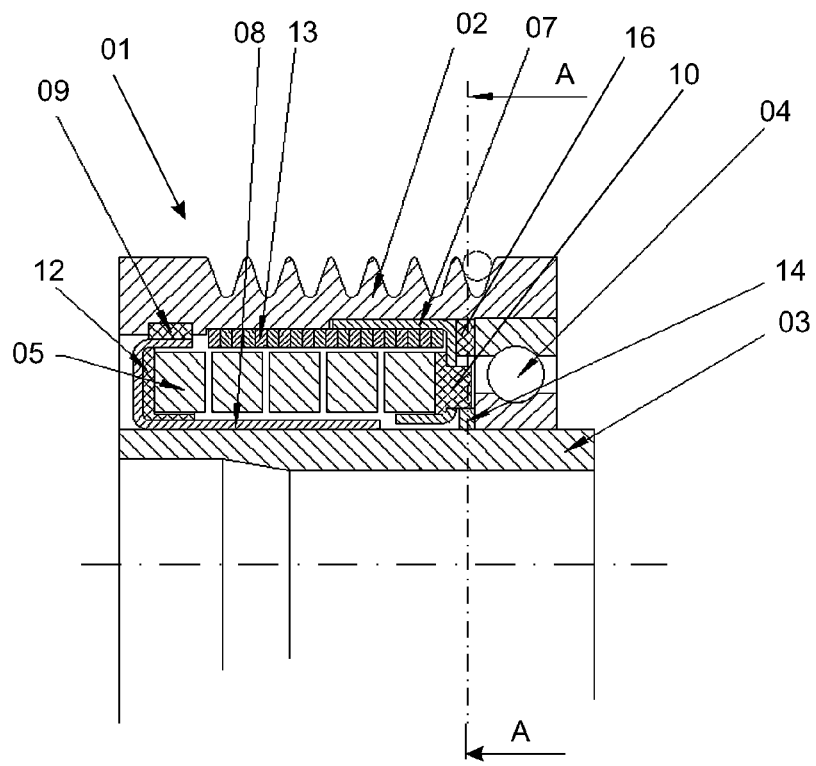
FIG. 1 a longitudinal section view of a belt pulley arrangement according to the invention in a first embodiment.
Figure 5:
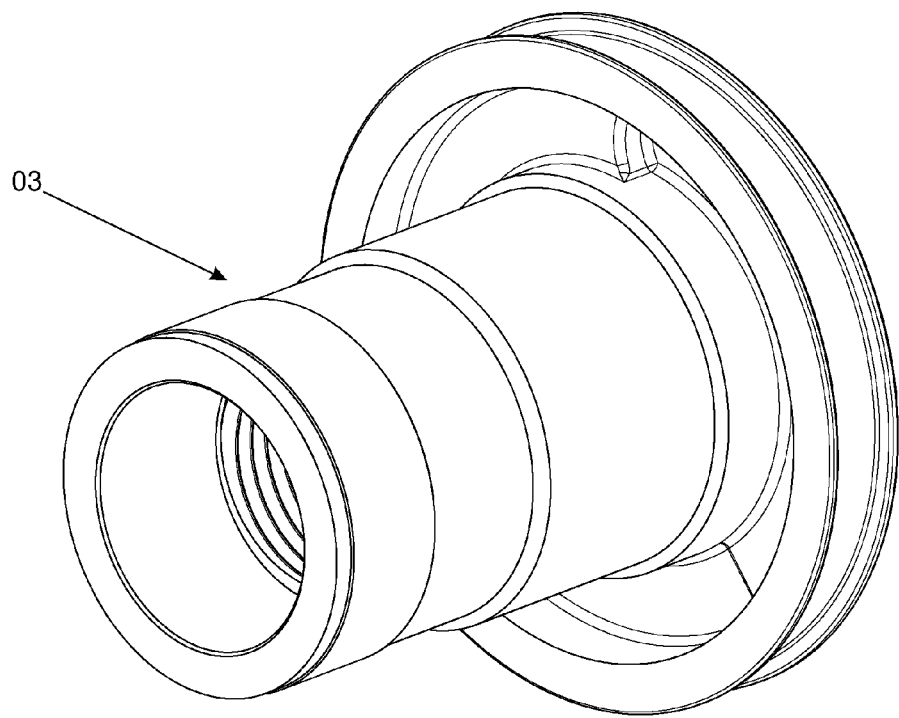
FIG. 5 a perspective view of a shaft.

FIG. 1 shows a longitudinal section view of a belt pulley arrangement 01 according to the invention in a first embodiment. The belt pulley arrangement 01 according to the invention initially comprises a belt pulley 02, which is supported so that it can rotate on a shaft 03 by a bearing 04. A perspective view of the shaft 03 can be seen in FIG. 5. Within the belt pulley 02 there is a torsion spring 05. The torsion spring 05 is arranged on each of its two ends in a respective sleeve 07, 08. A first sleeve 07 is connected so that it can rotate with a radial inner lateral surface of the belt pulley 02. A second sleeve 08 is mounted locked in rotation on the shaft 03. A press-fit connection is advantageously used for mounting the second sleeve 08. The second sleeve 08 is supported on the radial outside on a sliding bearing 09 that is arranged on the inner lateral surface of the belt pulley 02.

Within the first sleeve 07 there is a first spring ramp 10. In the second sleeve 08 there is a second spring ramp 12. The spring ramps 10, 12 are used as stops for the two ends of the torsion spring 05.

Radially between the belt pulley 02 and torsion spring 05 there is a looped flat spiral spring 13 that acts as a free-running coupling device. The looped flat spiral spring 13 contacts, in some sections, on the inner lateral surfaces of the first sleeve 07 and belt pulley 07 in its expanded state. In this way, the looped flat spiral spring 13 creates a non-positive connection that transmits the torque from the belt pulley 02 to the first sleeve 07. The looped flat spiral spring 13 is designed so that torque up to a predetermined maximum value can be reliably transmitted. By use of the first sleeve 07 and looped flat spiral spring 13, the torque is transmitted via the first spring ramp 10 to the torsion spring 05. By use of the second spring ramp 12 the torque is transmitted to the second sleeve 08, which forwards the torque to the shaft 03. If the torque exceeds the maximum value, the looped flat spiral spring 13 slips.

Through the overload protection integrated in this way in the belt pulley arrangement 01, the torsion spring 05 can be effectively protected from overloading, wherein its loading is reduced.

Figure 2:
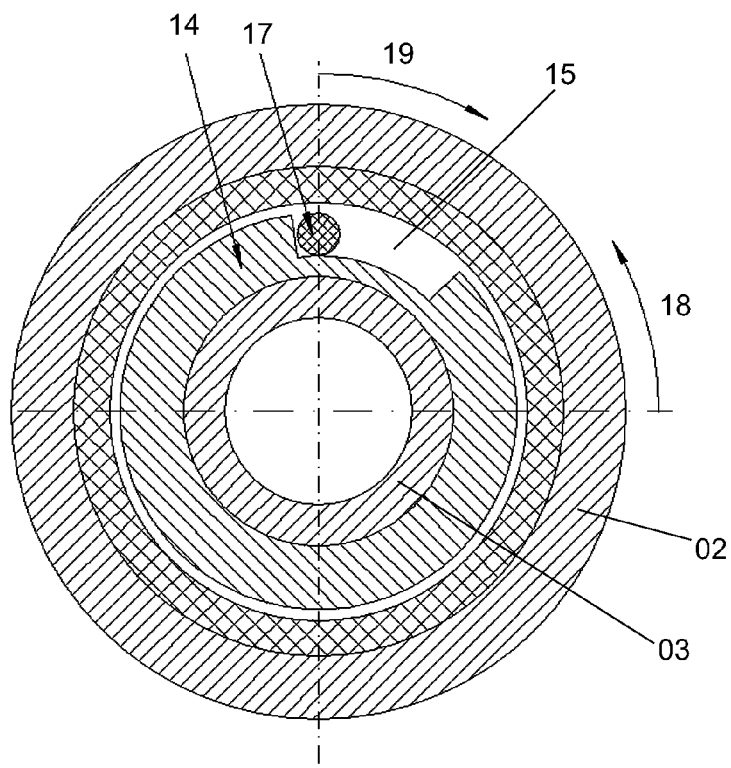
FIG. 2 a cross-sectional view of the belt pulley arrangement according to the invention along a line A-A in FIG. 1.
Figure 3:
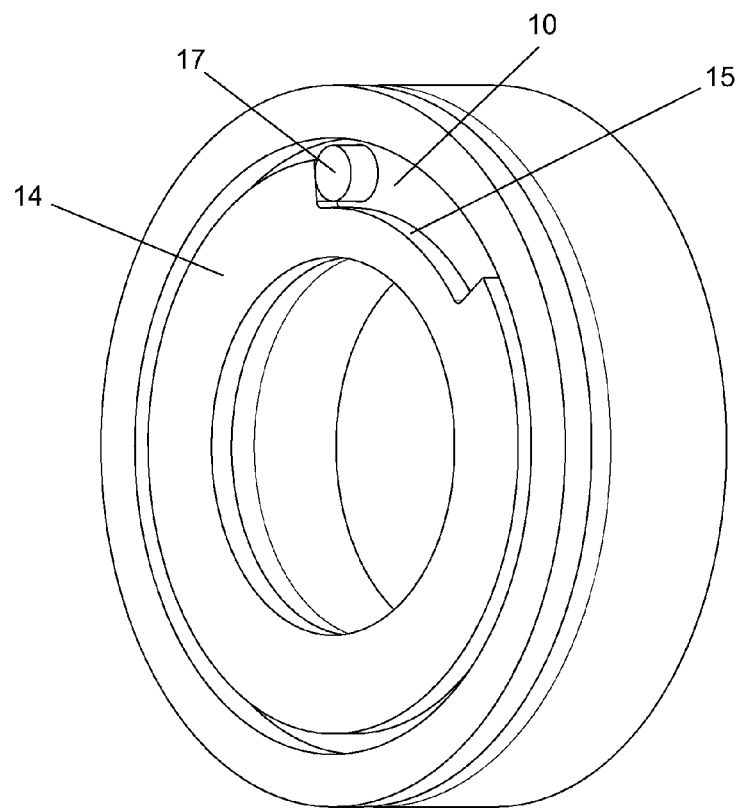
FIG. 3 a perspective view of a driving mechanism.
Figure 4:
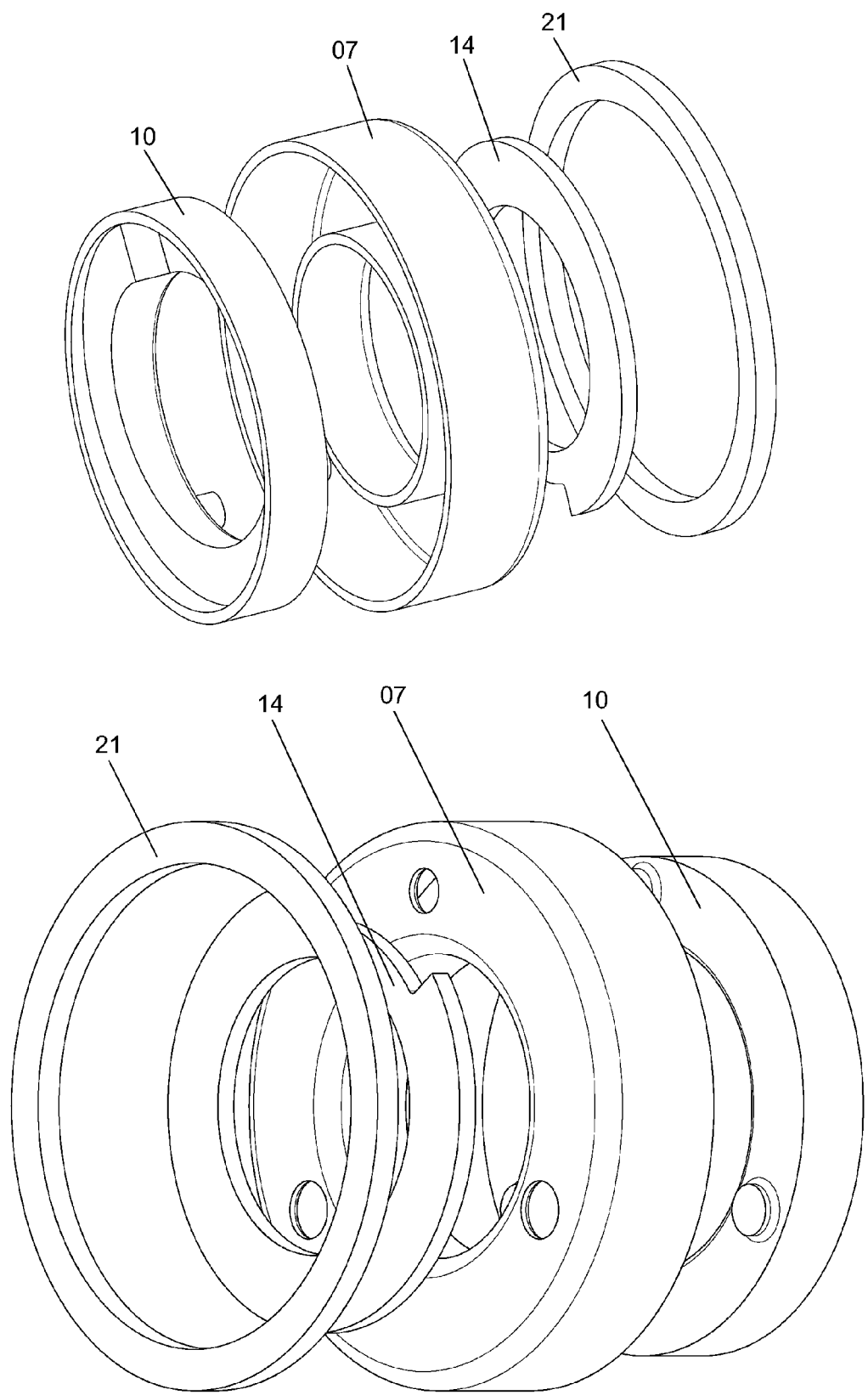
FIG. 4 two different perspectives of an exploded view of a driving disk and adjacent parts.

The illustrated embodiment of the belt pulley arrangement 01 also has a driving mechanism that can be seen, in particular, in FIG. 2 and FIG. 3. The driving mechanism comprises a driving disk 14 that is mounted on the shaft 03 and has a slot 15 running in the circumferential direction. FIG. 4 shows two different views of an exploded view of the driving disk 14 and adjacent components (first sleeve 07, spring ramp 10, intermediate ring 21). A pin 17 of the first spring ramp 10 engages axially in the slot 15. When the belt pulley 02 is loaded in a driving direction 18, the torsion spring 05 receives the torque and moves the pin 17 in the slot 15. In contrast, if the belt pulley 02 is deflected from the shown neutral position in a free-running direction 19, the driving disk 14 moves the pin 17. By means of the pin 17, the first sleeve 07 is also moved. In this way there is no relative movement between the two spring ramps 10, 12 and thus the torsion spring 05 is also carried along.

Figure 6:
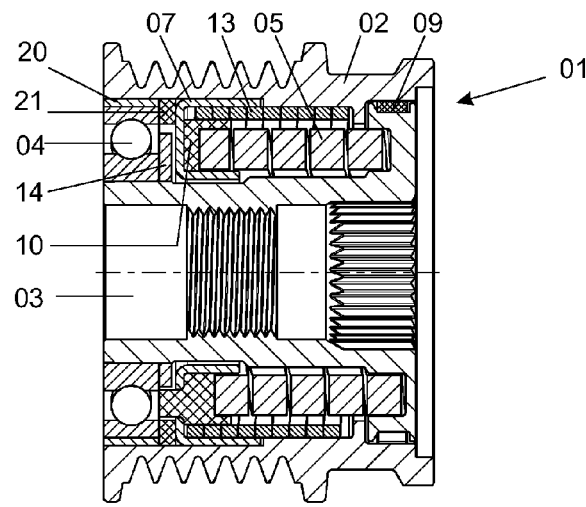
FIG. 6 a longitudinal section view of belt pulley arrangement according to the invention in a second embodiment.
Figure 7:
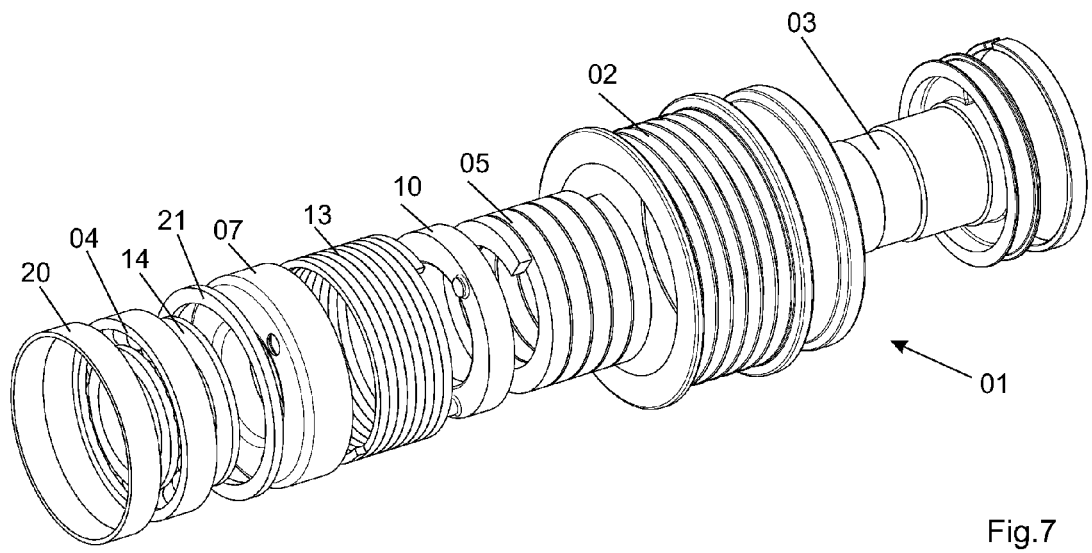
FIG. 7 an exploded view of the belt pulley arrangement as per FIG. 6.
Figure 8:
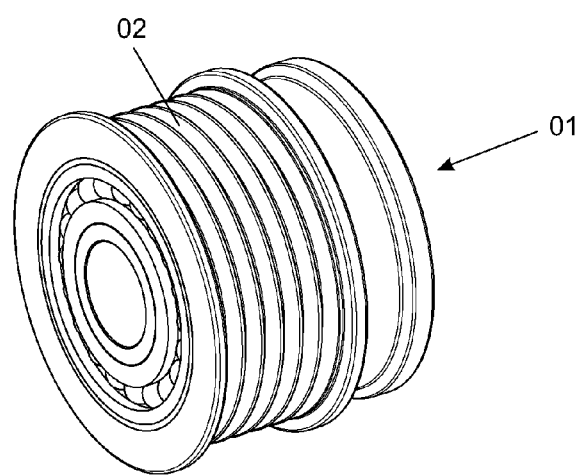
FIG. 8 a perspective view of the belt pulley arrangement as per FIG. 6.

FIG. 6 shows a longitudinal section view of the belt pulley arrangement 01 according to the invention in a second embodiment. An exploded view of a belt pulley arrangement 01 constructed in this way is contained in FIG. 7, while FIG. 8 shows a perspective view of the belt pulley arrangement 01. This construction differs from that shown in FIG. 1 in that the torsion spring 05 is arranged in a first sleeve 07 on only one of its axial ends. The first sleeve 07 is connected, in turn, so that it can rotate with the radial inner lateral surface of the belt pulley 02.

LIST OF REFERENCE SYMBOLS

01 Belt pulley arrangement
02 Belt pulley
03 Shaft
04 Bearing
05 Torsion spring
06 -
07 First sleeve
08 Second sleeve
09 Sliding bearing
10 First spring ramp
11 -
12 Second spring ramp
13 Looped flat spiral spring
14 Driving disk
15 Slot
16 -
17 Pin
18 Driving direction
19 Free-running direction
20 Retaining ring
21 Intermediate ring

The invention claimed is:

1. A belt pulley arrangement comprising
a belt pulley that is fastenable to rotate on a shaft,
a torsion spring arranged within the belt pulley that transmits torque between the belt pulley and shaft, the torsion spring having a first end that acts against the shaft and a second end that acts against the belt pulley,
a looped flat spiral spring arranged radially between the belt pulley and the torsion spring that acts as a free-running clutch,
the first end of the torsion spring is arranged within a first sleeve, and the first sleeve is connected to rotate with a radial inner lateral surface of the belt pulley, and the looped flat spiral spring is arranged radially between the first sleeve and the torsion spring, the looped flat spiral spring is movable to an expanded state in which, at least in some sections, the spiral spring contacts a radial inner lateral surface of the first sleeve and the radial inner lateral surface of the belt pulley.

2. The belt pulley arrangement according to claim 1, wherein the second end of the torsion spring is arranged in a second sleeve, and the second sleeve is connectable locked in rotation with the shaft.

3. The belt pulley arrangement according to claim 2, wherein a spring ramp is arranged in the first sleeve and a second spring ramp is arranged in the second sleeve, and the torsion spring is in contact with the first and second spring ramp for transmitting a torque from the belt pulley to the shaft.

4. The belt pulley arrangement according to claim 3, further comprising a driving disk that is fixable on the shaft, the driving disk has a slot extending across a partial area of a circumference thereof, and a pin of the first spring ramp engages in the slot.

5. The belt pulley arrangement according to claim 2, the second sleeve is supported on a radial outside thereof on a sliding bearing that is arranged on the radial inner lateral surface of the belt pulley.

6. The belt pulley arrangement according to claim 5, wherein the second sleeve is supported on the radial outside on a needle bearing that is arranged on the radial inner lateral surface of the belt pulley.

7. The belt pulley arrangement according to claim 6, wherein the second sleeve is connectable with the shaft by a press-fit connection.

8. The belt pulley arrangement according to claim 1, wherein the belt pulley arrangement is part of a belt drive of a motor vehicle.

9. A drive system of a motor vehicle with one main unit and at least one auxiliary unit that is connected to the main unit via a belt drive that comprises at least one belt pulley arrangement according to claim 1.

10. The drive system according to claim 9, wherein the main unit is an internal combustion engine and the auxiliary unit is an electric machine.

* * * * *